W. FUHRMANN.
MITER BOX.
APPLICATION FILED MAY 3, 1911.

1,006,201.

Patented Oct. 17, 1911.

2 SHEETS—SHEET 1.

Witnesses:
Christ Feinle, Jr.
V. B. Hillyard.

Inventor,
Warren Fuhrmann.
By Victor J. Evans,
Attorney.

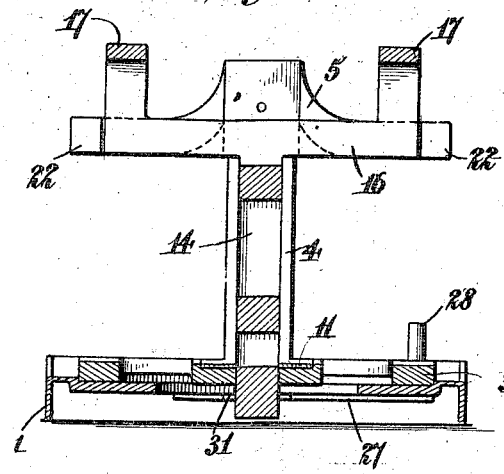
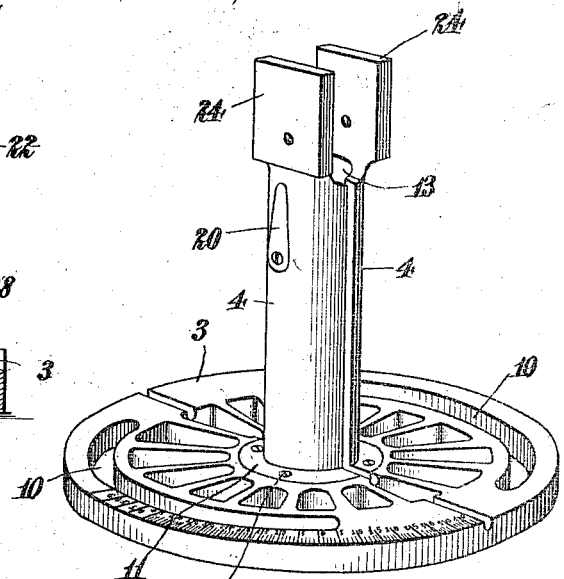
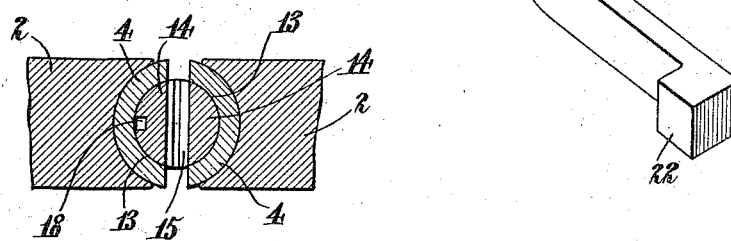

UNITED STATES PATENT OFFICE.

WARREN FUHRMANN, OF NEWARK, NEW JERSEY.

MITER-BOX.

1,006,201.

Specification of Letters Patent.     Patented Oct. 17, 1911.

Application filed May 3, 1911.   Serial No. 624,707.

*To all whom it may concern:*

Be it known that I, WARREN FUHRMANN, a citizen of the United States, residing at Newark, in the county of Essex and State of New Jersey, have invented new and useful Improvements in Miter-Boxes, of which the following is a specification.

This invention provides a device whereby molding or other material may be cut at any angle to meet the requirements of the particular work in hand, said device combining the features of a miter box and embodying a base, a work rest and a saw guide, the latter being rotatable and adapted to be adjusted to any angle according to the cut to be made, the angle being determined by suitable graduations.

The invention provides a saw guide of novel form, which may be adjusted to any height within certain limits and turned to any desired angle, the guide being of such construction and arrangement as not to limit the use of the device when it is required to make an angular cut approximating sixty degrees.

In accordance with this invention the saw guide embodies a rotary base having spaced uprights and guide members adjustably connected with the uprights and adapted to engage opposite sides of the saw in a manner to insure a proper cut being made at the required angle.

The invention consists of the novel features, details of construction and combination of parts, which hereinafter will be more particularly set forth, illustrated in the accompanying drawings, and pointed out in the appended claims.

Figure 1:
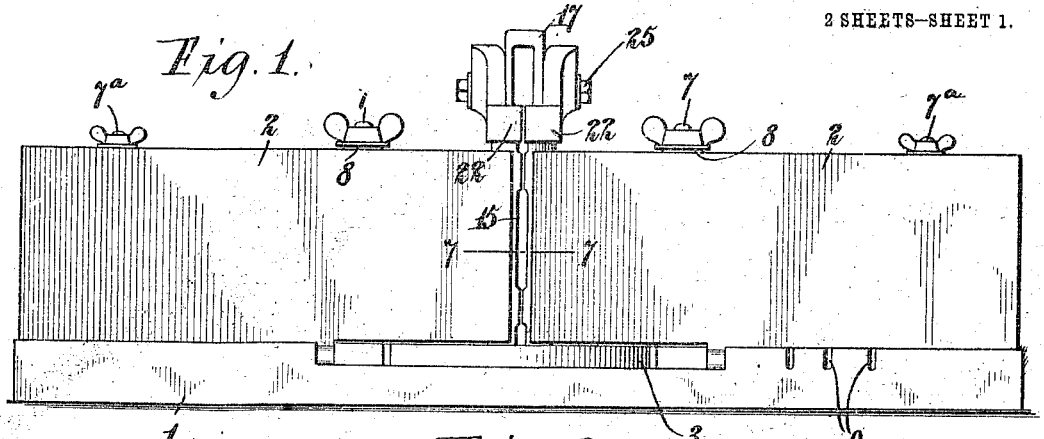
Figure 2:
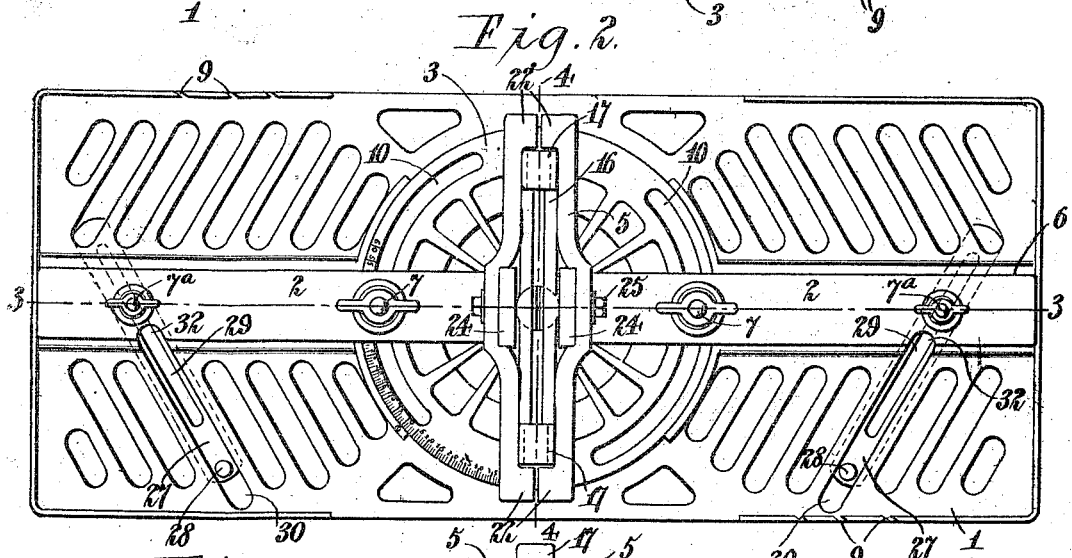
Figure 3:
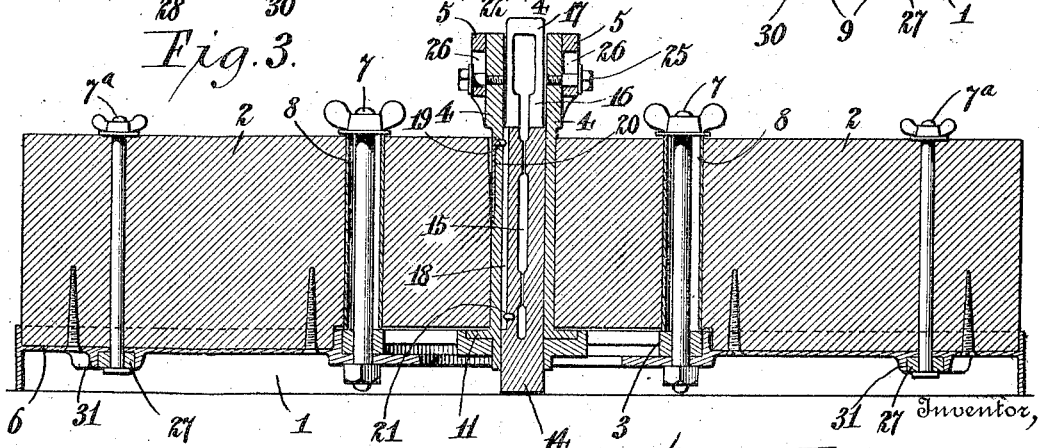

Referring to the drawings, forming a part of the specification, Figure 1 is a side view of a miter appliance embodying the invention. Fig. 2 is a top plan view thereof. Fig. 3 is a longitudinal section on the line 3—3 of Fig. 2. Fig. 4 is a cross section on the line 4—4 of Fig. 2. Fig. 5 is a detail view in perspective of one of the uprights applied to the rotary support. Fig. 6 is a detail perspective view of one of the guides. Fig. 7 is a horizontal section on the line 7—7 of Fig. 1.

Corresponding and like parts are referred to in the following description, and indicated in all the views of the drawings, by the same reference characters.

The device comprises a base 1, a work rest 2, a rotary support 3, uprights 4 and guide members 5, the several parts, with the exception of the work rest 2, being preferably constructed of metal. The base 1 in the preferred construction consists of a casting, which is cored for lightness and economy of metal. A longitudinal groove 6 is formed in the upper side of the base 1 midway of the longitudinal edges thereof and constitutes a seat in which the lower edge of the work rest 2 is fitted, said work rest being retained in place by means of bolts 7 and 7ª, which pass through openings formed in the work rest 2 and in the base 1. The openings through which the bolts 7 pass are lined by metal tubes 8. The work rest comprises similar parts each extending from the center outward. The upper side of the base is formed with a plurality of grooves 9, which afford clearance for the teeth of the saw after cutting through the work.

The rotary support 3 is of circular form and may be of any construction and is fitted in a circular recess formed centrally in the upper side of the base 1, the recess being of a depth corresponding to the thickness of the support to enable the upper surface of the support to come flush with the upper side of the base 1. As shown the rotary support consists of an outer ring, a center piece, and connecting arms. Arcuate slots 10 are formed in the outer or ring portion of the support at diametrically opposite points and receive the lower ends of the bolts 7. The support is retained in place by means of the work rest, which overhangs the recess in which the rotary support is fitted, said support being held in the required adjusted position by tightening the bolts 7, whereby the support is clamped between the work rest and the base. The outer portion of the rotary support has scale graduations to indicate degrees, which are arranged to coöperate with an indicating mark on the base so that the rotary support may be set to enable the work to be cut to any required angle.

The uprights 4 have base portions 11 which are adapted to be fitted in a recess formed in the upper side of the rotary support 3 and are secured thereto by fastenings 12, which pass through openings formed in the base portions 11 and enter threaded openings formed in the part 3. The uprights 4 are spaced apart a distance to receive the saw blade between them. The inner sides of the uprights 4 are recessed, as indicated at 13, and receive a stem 14 in which is formed a slot 15, said stem having a guide 16 at its upper end to receive the back of the saw. The guide 16 is in the nature of a cross head having hooks 17 at its ends. The guide and stem are formed together and the cross head consists of two members arranged to engage opposite sides of the saw blade adjacent and below the back thereof. The stem 14 is free to slide in the opening formed by the recesses in the sides of the uprights 4, which latter may be considered as a post. While the stem 14 is free to move vertically between the uprights or members comprising the post it is nevertheless prevented from turning between the uprights. For this purpose a vertical groove 18 is formed in a side of the stem and engages a pin 19 carried by a spring 20 secured at one end to a side of the post, said pin operating through an opening in one of the uprights 4 and entering the groove 18. The inner end of the pin 19 is made rounding so as to ride upon the outer end of a pin or stud 21 carried by the stem 14 and located near the lower end of the groove 18. When the stem 14 is elevated it is supported by the pin 19 engaging under the pin 21, the upward movement of the stem being limited by the pin 19 engaging the lower end of the groove 18. By having the opposing ends of the pins 19 and 21 made rounding the pin 21 is enabled to ride upon the inner end of the pin 19 upon applying proper force to the stem 14. While the guide 16 engages the back and upper portion of the saw blade the guides 5 engage opposite sides of the saw blade near the fluted edge, thereby preventing springing of the saw blade when starting the saw into the work. Each upright or member 4 of the post is provided with a guide 5, the latter consisting of a bar having inner projections 22 at its ends to engage opposite sides of the saw blade. A seat 23 is formed at the middle of each guide to receive the upper flattened end or head 24 of each member 4, a fastening 25 serving to secure the guide to the head 24 in the adjusted position, said guide being adjustable by means of the slot 26 formed therein.

A work gage is located near each end of the base and consists of a bar 27 having a vertical extension 28 at one end, said bar having a longitudinal slot 29 through which the lower end of the bolt 7ª passes. A slot 30 is formed in the base to receive the extension 28 and ribs 31 are pendent from the base in line with opposite walls of the slot 30 and form guides for the bar 27. The work rest 2 has a recess 32 in its side to receive the projection 28 when the work gage is moved so as not to interfere with the work placed upon the base and against the rest 2.

It is observed that the uprights 4, as also the stems of the saw guides, occupy a central position in line with the work rest 2, hence adjustment of the saw guides to any required angular position will not interfere materially with placing the work in position to be cut, since the upper portion of the saw guides extends over the work and the part connecting the upper portion with the base is in line with the work rest. This would not be the case if uprights were located upon the outer portion of the support 3, since said uprights would be brought near the work rest when adjusting the saw guide to an angle greater or less than a right angle.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A miter appliance comprising a base, a rotary support mounted upon the base and having spaced uprights forming guiding elements for the saw, a work rest mounted upon the base and having portions overhanging the rotary support, said work rest being in line with the aforesaid uprights, and means for securing the work rest to the base and clamping the rotary support in the adjusted position.

2. In a miter appliance, the combination of a base, a work rest mounted upon the base, a rotary support, spaced uprights projecting from the rotary support in line with the work rest, and saw guides adjustably connected with the said uprights.

3. In combination a base, a rotary support mounted upon the base and having a groove in its upper side, spaced uprights having base members secured in the groove of the rotary support, and saw guides adjustably connected with said uprights.

4. In combination a base, a rotary support mounted upon the base and having a groove in its upper side, spaced uprights having base portions secured in the groove of the rotary support and having recesses in their opposing sides, and saw guides each consisting of a cross head and a stem arranged with their stems fitted in the recesses of said uprights.

5. In a miter appliance, the combination of a base, a rotary support mounted up the base, means for securing the support in the required angular adjusted position, said rotary support being provided with saw guides, and a stem vertically adjustable in said support and provided at its upper end with saw guides.

6. In a miter appliance, the combination of a base, a rotary support mounted upon the base, means for securing the support in an adjusted position, saw guides adjustable upon the rotary support, a stem movable vertically in the rotary support, and a saw guide carried by said stem.

7. In a miter appliance, the combination of a base, a rotary support mounted upon the base, a post mounted upon the rotary support and embodying spaced members, saw guides adjustably connected to the upper ends of the members of the post, a stem mounted to move vertically in the post, and a saw guide at the upper end of the stem to engage the back and upper portion of the saw blade.

8. In a miter appliance, the combination of a base, a rotary support mounted upon the base, a post carried by the rotary support, a stem movable vertically in the post and having a vertical groove in a side, a pin yieldably mounted upon the post and adapted to enter the groove of the stem to prevent turning of the latter, a pin set into the stem near the lower end of the vertical groove and adapted to engage the yieldable pin to hold the stem elevated, and a saw guide at the upper end of the stem.

In testimony whereof I affix my signature in presence of two witnesses.

WARREN FUHRMANN.

Witnesses:
OSCAR W. SODERSTROM,
ALEXANDER SODERSTROM.

---

Copies of this patent may be obtained for five cents each, by addressing the "Commissioner of Patents, Washington, D. C."